UNITED STATES PATENT OFFICE.

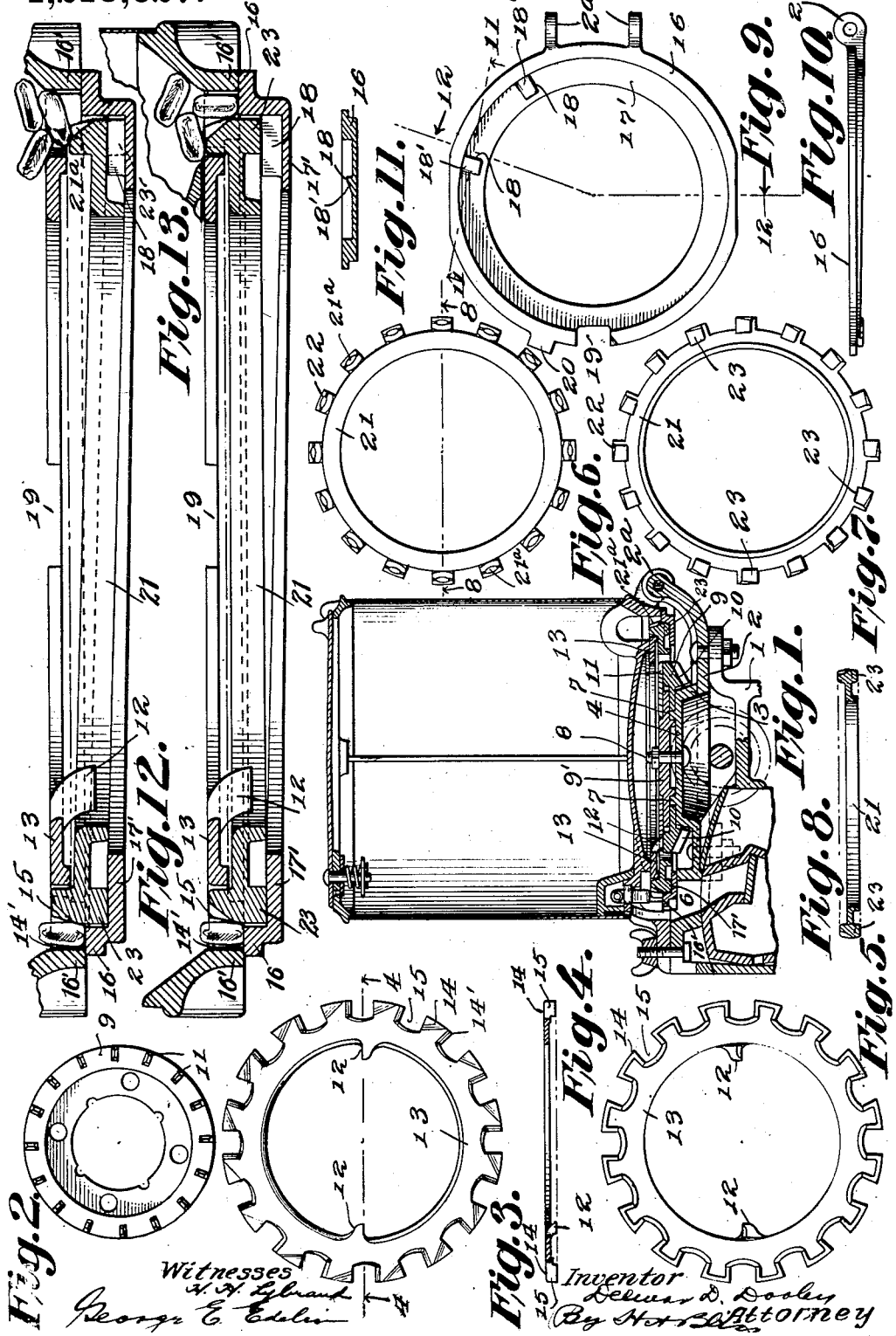

DELMAR D. DOOLEY, OF ROCK ISLAND, ILLINOIS, ASSIGNOR TO DEERE & MANSUR COMPANY, OF MOLINE, ILLINOIS, A CORPORATION OF ILLINOIS.

SEED-PLATE AND AGITATOR MECHANISM FOR PLANTERS.

1,215,627.     Specification of Letters Patent.     Patented Feb. 13, 1917.

Application filed May 18, 1914. Serial No. 839,425.

*To all whom it may concern:*

Be it known that I, DELMAR D. DOOLEY, a citizen of the United States, residing at Rock Island, in the county of Rock Island and State of Illinois, have invented certain new and useful Improvements in Seed-Plate and Agitator Mechanism for Planters, of which the following is a specification, reference being had therein to the accompanying drawing.

This invention relates to improvements in seed planting mechanism, and particularly to improvements in the devices which are used for separating seeds, one by one, from an indiscriminate mass in a receptacle and carrying them to, and delivering them at, a place of deposit from which they are taken to the ground.

The object of the invention is to provide devices which will act in a positive manner to insure that the seeds (such as corn kernels) shall be individually separated entirely from the mass and that they shall be so positioned as to stand edgewise in the cells provided for them.

Figure 1 is a vertical section of a planter seeding mechanism embodying my improvements.

Fig. 2 is a top view of the horizontal gear plate.

Fig. 3 is a top plan; Fig. 4 a section; Fig. 5 a bottom view of the seed plate.

Fig. 6 is a top view; Fig. 7 a bottom view; and Fig. 8 a cross section of the agitating, or cell-filling device.

Fig. 9 is a plan view; Fig. 10 an edge view; and Fig. 11 an eccentric cross section (on line 11—11 of Fig. 9) of the hopper bottom plate.

Figs. 12 and 13 are sections on larger scales on the vertical planes of the line 12—12, showing the bottom plate, the cell plate or ring, and the agitator or cell-filling device; and illustrating the latter device in its two extreme positions, vertically.

1 indicates the upper portion of the shank frame or boot of a corn planter. 2 is the base casting which is secured to the upper end of the shank or boot. At the central part it extends forward as shown at 3 and has a horizontal plate 4, the metal of which it is composed extending to and around the seed passageway at 6 into which passage the seed drops from the delivery devices at the bottom of the hopper. At 7 there is a ring flange extending upward for centering the rotary parts. 9 is the horizontal gear wheel, in ring form, with an open center receiving the flange 7. The gear teeth are shown at 10 and driven by any ordinary driving gear; and 11, 11 are the teeth or projections which extend upward for engagement with the seed dropping parts. 9' is a plate having a laterally projecting part fitting over the gear ring, and 8 is a bolt and nut device for clamping it to the bottom part 4.

13 indicates the cell plate or ring. It has a large open center with lugs at 12 adapted to engage lugs 11 on drive plate 9. The cells are shown at 15, 15. The metal projections or teeth between each cell and the next are cut away as shown at 14 to leave kernel-agitating points at 14' adapted to stir or agitate the overlying corn kernels.

This cell plate is rotatably supported on the bottom plate or ring 16 of the seeder. This latter has a ring flange 17', as shown in Figs. 12 and 13, and one or more lugs 18, each with a sloping side 18'. It also has a recess or aperture at 19 which registers with the seed passage 6, perforated ears 2ª (positioned to register with the upward projecting part of the fixed base frame 2 for hinging them together), and a lug 20 to receive the spring fastener which holds the seed receptacle in position.

This bottom part 16 is shaped, as shown in Figs. 12 and 13, so that the chamber within it gradually widens or deepens on lines extending from points near the discharge orifice 19 to points near the lugs 18.

The seed plate 13 rests upon the top of the ring 16 and rotates in horizontal planes, its inward projecting lugs 12, above referred to, extending downward, also as shown in Figs. 12 and 13, far enough to engage with the power-imparting lugs 11 on the drive plate 9.

The agitating device 21 is preferably in the form of a ring or narrow annulus having teeth which project radially outward, and also upward from the top horizontal plane of the plate. These projections, when looked at in plan, are of the conformation shown in Fig. 6, and when looked at from the bottom, are as shown in Fig. 7, each having an inclined or cam-like face 23. These teeth or projections on the agitating part 21 are equal in number to the recesses 15 in the seed plate 13, and their horizontal dimensions are such that they will fit loosely therein, the diameter of the part 21, from outside to outside, being less than the total diameter of the seed plate 13.

The seed plate can fit over the agitator ring and the teeth of the latter are adapted to extend up into the cavities or recesses 15, as shown in Fig. 13. When the part 21 is in its highest positions in relation to the seed ring, the top points of the teeth 22 come to, or approximately to, the horizontal plane of the tops of the cells 15. The projections are each cut away or chamfered, as shown at 21ª, so as to form sloping bottom surfaces which are inclined toward the outer parts of the kernel cells. The cell, proper, for each kernel is bounded on the bottom by the top of ring 16, on the outside by the vertical part 16' of the hopper bottom causing, at each end by one of the end surfaces of a projection 15' of the cell plate, and at the inner side by the metal of one of the agitating teeth 22. Kernels are shown in position in their cells in Fig. 13.

But as much trouble is experienced in inducing the kernels to seat themselves edgewise in their recesses, the parts of the present structure are so arranged that there shall be a constant, positive, and vigorous agitation caused among the kernels immediately adjacent each of the cells, proper. The tendency is for two or more kernels to get some of their parts inserted in the cell space and to wedge there to such an extent that they pass under the cut-off and cause errors in the counting of the kernels for the hills.

It will be understood that this mechanism is intended for use in selecting kernels, one by one. and successively. from the miscellaneous mass of seed in the hopper 30 to insure the securing of one seed in each cell and to avoid the entering of more than one.

The kernels are in the hopper or can in a mass extending from side to side and filling its interior. Those on the outer sides of the mass tend to travel directly downward toward the tapering passageway between the cap and the can ring wall 26, and those in the center of the mass tend to squeeze and travel outward toward the same passageway. When they come to the horizontal planes at the top surface of the cell plate 13, the intention is to have one of them finally seat itself on one of its long side edges in each cell, as shown at the left hand in Fig. 13. But as above noted, it frequently happens that two, or more, will attempt to enter together, as shown at the right hand in Fig. 12. To permit the entrance of one kernel only and expel the others, and at the same time, if it is necessary, turn the entering kernel from one position to another so that it will drop edgewise into the cell chamber, use is made of the devices above referred to, that is to say, the agitator 21 is, while it is rotating, repeatedly lifted and dropped at the side adjacent the lugs 18. The cell plate 13 is caused to rotate by the drive plate 11, and as the metal at the edges of its recesses 15 is constantly engaging with the sides of the projections 22 on the agitator plate, the latter is also rotated synchronously with the seed plate; and as these teeth or projections 22 successively reach the inclined lugs 18, they, one after the other, ride up on that side of the ring a distance equal to the height of the lugs, and then drop. There are therefore as many of these vertical vibrations or liftings and droppings of one side of the agitator ring as there are cells 15 and projections 22. In Fig. 13, at the right hand side, the agitator ring is shown in the position occupied when the right hand side is lifted to the height of the lugs; in Fig. 12 it is shown just after it has dropped again to its lowermost position.

When pushed up, as shown in Fig. 13, the top of each tooth in the agitator comes to, or nearly to, the top plane of the cell plate 13, and in so moving upward, it pushes upward any kernel that lies above it. If such kernel is interfering with the proper entrance of that kernel which is nearest to the cell, it is carried away sufficiently far to permit the other one to position itself properly. And the latter kernel is at the same time (if it is inclined to the horizontal or in a non-vertical position) induced to place itself edgewise vertically so that it can drop into the true cell space at the outer end of the recess 15.

It will be seen that it is not only a positive lifting of the kernels because of the rising of one side of the agitator ring and a thrusting of its teeth or projections upward in the cells 15, but that there is a shaking and agitating of the superincumbent mass by the frequent droppings of the agitator.

As the agitator rotates toward the discharge orifice at 19, the up and down movements of the teeth or projections 22 become relatively less and less, and such movement becomes practically *nil* as the successive projections 22 move through that part of their orbit which is adjacent to the discharge.

After a kernel has once secured its proper seating in its cell, it is comparatively difficult to dislodge it. And therefore the subsequent vertical movements of the agitator plate and its projections do not affect the kernels as they approach the region of discharge. But as the emptied cells pass out from the cut-off devices and are again exposed under the indiscriminate mass of kernels, the agitator projections 22 respectively positioned in these cells gradually vibrate more and more until they have traveled around a large part of their orbit, and then after that, continue their marked rising and falling movements.

What I claim is:

1. In a seed-separating mechanism, the combination with a movable seed plate with cells, of a seed-agitating device movable independently of the seed plate and in the cells thereof and adapted to permit seeds to move downward from the cells successively while it is positioned therein.

2. In a seed-separating mechanism, the combination with a movable seed plate having cells, of an agitator having seed-engaging parts movable in the cells independently of the seed plate and adapted to permit seeds to move downward from the cells successively while it is positioned therein.

3. In a seed-separating mechanism, the combination with a movable seed plate having cells, of the agitating means having seed-engaging parts in the cells movable with the seed plate and also independently thereof and adapted to permit seeds to move downward from the cells successively while the seed-engaging parts are positioned therein.

4. In a seed-separating mechanism, the combination with a movable seed plate having cells, of the agitating means supported below the seed plate and having seed-engaging parts movable vertically through the seed plate from points below it, said seed-engaging parts being adapted to permit the passage of seed downward from the cells while said parts are positioned therein.

5. In a seed-separating mechanism, the combination with the movable seed plate having cells, of the agitating means having seed-engaging parts lying in the seed cells and movable vertically through the cells from points below them, and adapted to permit the seed to escape downward from the cells while said seed-engaging parts are situated therein.

6. A seed-separating mechanism having two rotary elements which provide seed-engaging and propelling parts, the first of said elements having cells and the second being vertically movable relatively to the other to agitate the seed above them and having vertically movable projections respectively permanently alined vertically with the cells and adapted to move therein.

7. A seed-separating mechanism having a rotary seed-receiving-and-propelling means comprising two rotary elements which are movable together around a vertical axis, and one of which is vibratable vertically relatively to the other to agitate the seed.

8. A seed-separating mechanism having means for receiving, engaging with, and propelling the seed, comprising two elements rotating about a vertical axis, one above the other, the lower element being movable vertically independently of the other.

9. In a seed-separating mechanism, a movable seed plate having vertically arranged cells which are normally relatively large and each adapted to permit a seed to pass therethrough on vertical lines independently of the other cells, of movable means for exposing to the seed the entireties of the cells during part of their travel and reducing the sizes of the cells during the remainder of their travel, and maintaining the reduced sizes at the times when the seeds escape downward from the cells.

10. In a seed-separating mechanism, the combination with the movable seed plate having cells, of the agitating means positioned below the seed plate and having seed-engaging parts movable upward through the cells to move the seed above the plate, and adapted to permit the seeds to pass vertically from the cells while said parts are therein.

11. In a seed-separating mechanism, the combination with a rotatable seed plate having cells each for a single seed but normally larger than said seed, means permanently alined with and intermittingly partially filling said cells respectively while seeds are therein and vertically movable therein independently of the seed plate to alternately enlarge and diminish the cells.

12. In a seed-separating mechanism, the combination with a rotatable seed plate having cells each larger than one of the seeds to be carried thereby, of a supplemental device permanently alined with and partially filling each of said cells while seeds are therein, and means for moving said device relatively to the normal walls of the cells to alternately enlarge and diminish the cells.

13. In a seed-separating mechanism, the combination with the movable seed plate having apertures or recesses larger than the seeds that are to be carried thereby, of seed-engaging devices adapted to be respectively positioned within the said apertures or recesses and when therein provide cells each adapted to hold a single seed in a predetermined position, and automatically acting means for positively moving the seed-engaging device independently of the plate during each of its rotations.

14. In a seed-separating mechanism, the combination with the movable seed plate having normally relatively large cells into and from each of which seed can pass vertically, and means in permanent vertical alinement with each of the cells for reducing its size while traveling near the discharge point and for enlarging the size while traveling through the other parts of its path.

15. In a seed-separating mechanism, the combination of the rotary plate having seed-carrying means, and a positively actuated agitator positioned below the plate and adapted to be moved upward through the plate and engage with the seeds above it.

16. In a seed-separating mechanism, the combination of the movable delivering device having seed-engaging devices, of the positively actuated agitating device positioned below the delivering device and adapted to be moved upward through it and engage with the seeds that are above it and displace them.

17. In a seed-separating mechanism, the combination with the rotating seed plate having cells, of the agitator positioned below the seed plate and having seed-engaging means in each of the said cells movable vertically across the horizontal planes at the bottoms of the cells.

18. In a seed-separating mechanism, the combination of the rotary seed plate having a series of cells, of the agitator positioned below the seed plate and rotated thereby, and means for positively moving the agitator independently of the seed plate and causing it to engage with the seed above the plate.

19. In a seed-separating mechanism, the combination with a rotary seed plate having peripheral cells, each being, on tangential lines, of substantially the length of the seed and each on radial lines being normally wider than the thickness of the seed, and a movable seed-engaging device for each of said cells normally positioned at the inner side thereof and movable relatively to the cell walls of the seed plate.

20. In a seed-separating mechanism for planters, the combination with a movable seed carrier having cells each adapted to carry a single seed in a predetermined relative position, of an agitating means having a seed-engaging device movable independently of the seed carrier in the horizontal planes between the top plane and the bottom plane of said seed-carrying device.

In testimony whereof, I affix my signature, in presence of two witnesses.

DELMAR D. DOOLEY.

Witnesses:
O. F. LUNDAHL,
CLARENCE R. BOHMAN.